(12) United States Patent
Naik et al.

(10) Patent No.: US 12,092,332 B2
(45) Date of Patent: Sep. 17, 2024

(54) FUEL NOZZLE AND SWIRLER

(71) Applicant: General Electric Company, Schenectady, NY (US)

(72) Inventors: Pradeep Naik, Bengaluru (IN); Ajoy Patra, Bengaluru (IN); Michael T. Bucaro, Arvada, CO (US); Perumallu Vukanti, Bengaluru (IN); Steven C. Vise, West Chester, OH (US); Michael A. Benjamin, Cincinnati, OH (US); Manampathy G. Giridharan, Evendale, OH (US); Saket Singh, Bengaluru (IN); Clayton S. Cooper, Evendale, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 17/675,270

(22) Filed: Feb. 18, 2022

(65) Prior Publication Data
US 2023/0204215 A1 Jun. 29, 2023

Related U.S. Application Data

(60) Provisional application No. 63/294,620, filed on Dec. 29, 2021.

(51) Int. Cl.
| | | |
|---|---|---|
| *F23R 3/28* | (2006.01) |
| *F02C 7/22* | (2006.01) |
| *F23C 7/00* | (2006.01) |
| *F23D 17/00* | (2006.01) |
| *F23L 7/00* | (2006.01) |
| *F23R 3/14* | (2006.01) |
| *F23R 3/36* | (2006.01) |

(52) U.S. Cl.
CPC .............. *F23R 3/286* (2013.01); *F02C 7/22* (2013.01); *F23C 7/004* (2013.01); *F23D 17/002* (2013.01); *F23L 7/002* (2013.01); *F23R 3/14* (2013.01); *F23R 3/36* (2013.01)

(58) Field of Classification Search
CPC .............. F23R 3/28; F23R 3/286; F02C 7/22
See application file for complete search history.

(56) References Cited

U.S. PATENT DOCUMENTS

| 4,218,020 | A | | 8/1980 | Reider | |
|---|---|---|---|---|---|
| 5,165,241 | A | * | 11/1992 | Joshi | ......................... F23R 3/14 60/737 |
| 5,373,694 | A | * | 12/1994 | Clark | ........................ F23R 3/28 60/740 |
| 5,392,720 | A | | 2/1995 | Briggs et al. | |
| 5,826,423 | A | | 10/1998 | Lockyer et al. | |

(Continued)

FOREIGN PATENT DOCUMENTS

| EP | 1251309 A1 | 10/2002 |
|---|---|---|
| JP | 6018714 B2 | 11/2016 |

*Primary Examiner* — Arun Goyal
(74) *Attorney, Agent, or Firm* — McGarry Bair PC

(57) ABSTRACT

An engine can utilize a combustor to combust fuel to drive the engine. A fuel nozzle assembly can supply fuel to the combustor for combustion or ignition of the fuel. The fuel nozzle assembly can include a swirler and a fuel nozzle to supply a mixture of fuel and air for combustion. The fuel nozzle assembly can be configured to increase lateral provision of fuels to reduce flame scrubbing on combustor liners for the combustor.

20 Claims, 16 Drawing Sheets

(56) References Cited

U.S. PATENT DOCUMENTS

| | | | |
|---|---|---|---|
| 5,983,649 A | 11/1999 | Aislabie et al. | |
| 6,676,048 B1 | 1/2004 | Tiemann | |
| 9,371,990 B2 | 6/2016 | Moran et al. | |
| 10,295,188 B2 | 5/2019 | Carrotte et al. | |
| 10,731,861 B2 | 8/2020 | Schlein | |
| 11,506,390 B2 * | 11/2022 | Snyder | F23R 3/14 |
| 2004/0050070 A1 * | 3/2004 | Sprouse | F23K 5/002 |
| | | | 60/776 |
| 2004/0146821 A1 | 7/2004 | Joshi | |
| 2005/0252218 A1 | 11/2005 | Chen et al. | |
| 2014/0318135 A1 | 10/2014 | Knapp et al. | |
| 2016/0209040 A1 * | 7/2016 | Tamura | F02C 3/14 |
| 2017/0328569 A1 * | 11/2017 | Yellapantula | F23R 3/346 |
| 2018/0335214 A1 * | 11/2018 | Strickland | F23R 3/286 |
| 2019/0056109 A1 * | 2/2019 | Li | F23R 3/06 |
| 2021/0341147 A1 * | 11/2021 | Wada | F02C 7/22 |

\* cited by examiner

FUEL NOZZLE AND SWIRLER

CROSS-REFERENCE TO RELATED APPLICATION(S)

This application claims priority to and the benefit of U.S. Provisional Patent Application No. 63/294,620, filed Dec. 29, 2021, the entirety of which is incorporated herein by reference.

FIELD

The present subject matter relates generally to a combustor for a turbine engine, the combustor having one or both of a fuel nozzle and a swirler.

BACKGROUND

An engine, such as a turbine engine, can include a turbine or other feature that is driven by combustion of a combustible fuel within a combustor of the engine. The engine utilizes a fuel nozzle to inject the combustible fuel into the combustor. A swirler provides for mixing the fuel with air in order to achieve efficient combustion.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
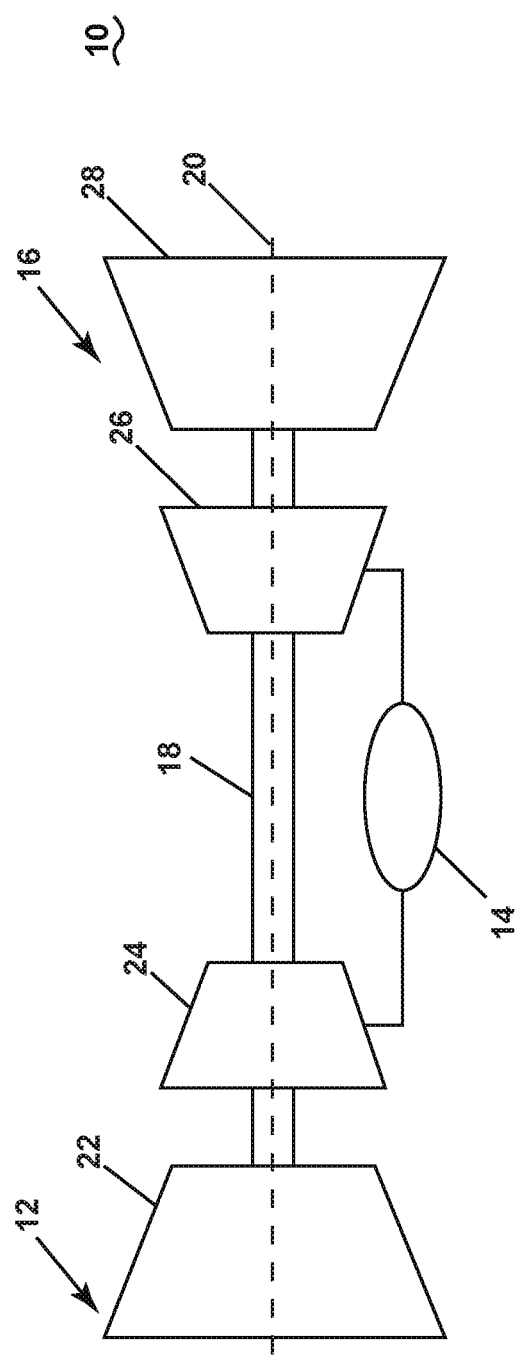
FIG. 1 is a schematic cross-sectional view of an engine in accordance with an exemplary embodiment of the present disclosure.

Aspects of the disclosure herein are directed to a fuel nozzle and swirler architecture located within an engine component, and more specifically to a fuel nozzle structure, nozzle cap structure, or swirler structure configured for use with heightened combustion engine temperatures, such as those utilizing a hydrogen fuel of hydrogen fuel mixtures. Higher temperature fuels like hydrogen fuels can reduce or eliminate carbon and NOx emissions, but generate challenges relating to flame holding or flashback due to the higher flame speed and high-temperatures. Current combustors include a durability risk when using such high-temperature fuels due to flame holding or flashback on combustor components when using such fuels. For purposes of illustration, the present disclosure will be described with respect to a turbine engine for an aircraft with a combustor driving the turbine. It will be understood, however, that aspects of the disclosure herein are not so limited, and can have additional applicability in other commercial, residential, or industrial applications.

During combustion, the engine generates high local temperatures. Efficiency and carbon emission needs require fuels that burn hotter than traditional fuels, or that reduced carbon emissions require the use of fuels with higher burn temperatures, like hydrogen fuel. For example, burn temperatures and burn speeds can be higher than that of current engine fuels, such that existing engine designs would include durability risks operating with such fuels or under the heightened temperatures required for heightened efficiency and emission standards.

Reference will now be made in detail to the fuel nozzle and swirler architecture, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The term "flame holding" relates to the condition of continuous combustion of a fuel such that a flame is maintained along or near to a component, and usually a portion of the fuel nozzle assembly as described herein, and "flashback" relate to a retrogression of the combustion flame in the upstream direction. The term "flame scrubbing" relates to the condition of the combusted flame brushing against the inner or outer combustor liner, or other component.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. The term 'lateral' as used herein can represent a sideways direction, relative to an upward or downward direction, or relative to a radial direction. More specifically, a lateral direction as used herein can represent a direction tangent to the circumference of the element, a direction perpendicular to a radius extending from a central or longitudinal axis, or in a circumferential direction, where a lateral direction includes a curved geometry to account for the annular arrangement of the fuel nozzle assembly, combustor section, or engine discussed herein. For example, the lateral direction can be tangent to the circumferential direction defined by the annular combustor. In another example, the lateral direction can be tangent to the circumferential direction defined by the annular fuel nozzle assembly, fuel nozzle, or swirler. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The combustor introduces fuel from a fuel nozzle, which is mixed with air provided by a swirler, and then combusted within the combustor to drive the engine. Increases in efficiency and reduction in emissions have driven the need to use fuel that burns cleaner or at higher temperatures. There is a need to improve durability of the combustor under these operating parameters, such as improved flame control to prevent flame holding on the fuel nozzle and swirler components.

FIG. 1 is a schematic view of an engine as an exemplary turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor and turbine sections 12, 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an LP turbine 28, and an HP turbine 26 serially, fluidly coupled to one another. The drive shaft 18 can operatively couple the LP compressor 22, the HP compressor 24, the LP turbine 28 and the HP turbine 26 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
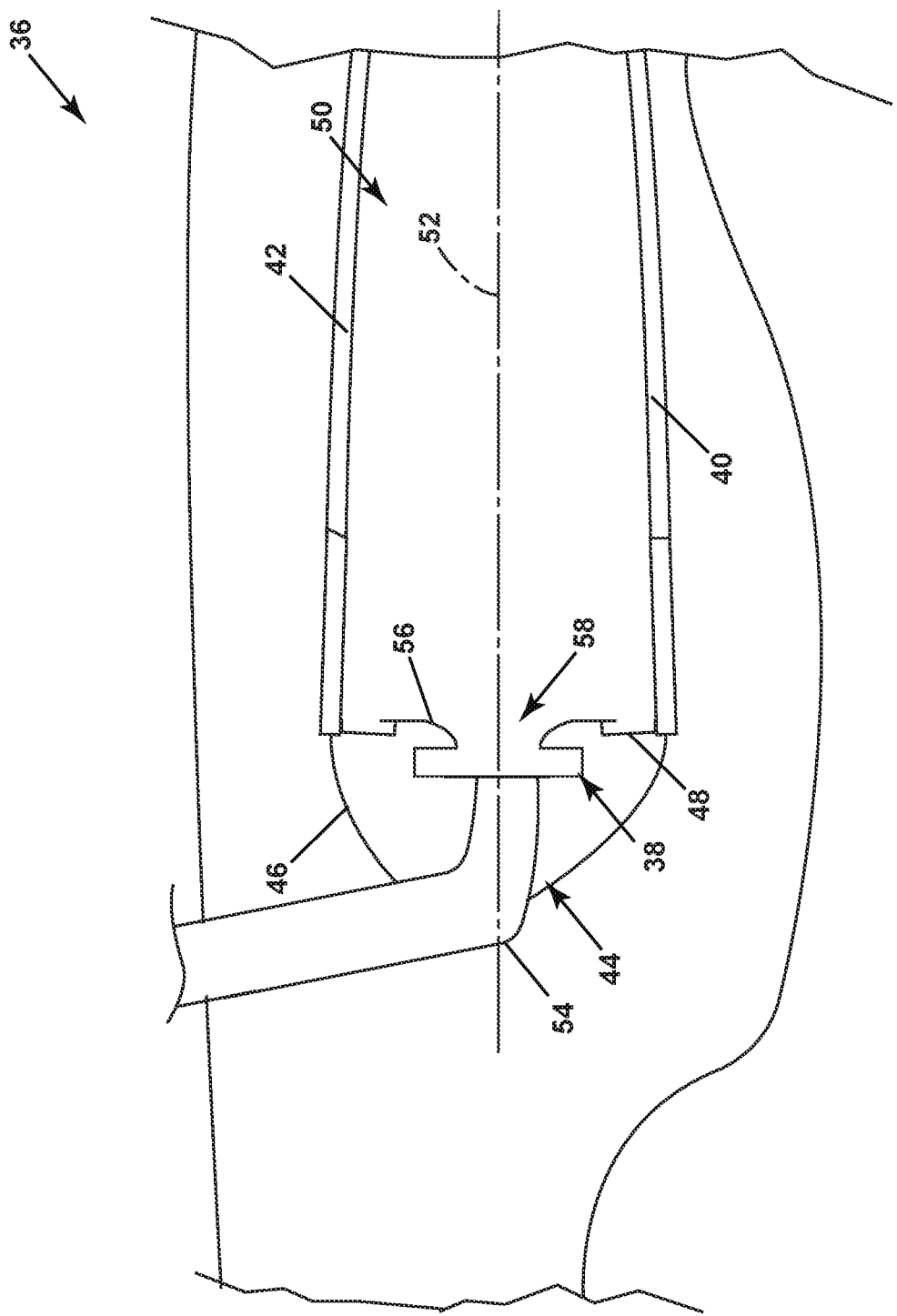
FIG. 2 is a schematic cross-sectional view of a combustor for the engine of FIG. 1 in accordance with an exemplary embodiment of the present disclosure.

FIG. 2 depicts a cross-section view of a combustor 36 suitable for use in the combustion section 14 of FIG. 1. The combustor 36 can include an annular arrangement of fuel nozzle assemblies 38 for providing fuel to the combustor 36. It should be appreciated that the fuel nozzle assemblies 38 can be organized as in an annular arrangement including multiple fuel injectors. The combustor 36 can have a can, can-annular, or annular arrangement depending on the type of engine in which the combustor 36 is located. The combustor 36 can include an annular inner combustor liner 40 and an annular outer combustor liner 42, a dome assembly 44 including a dome 46 and a deflector 48, which collectively define a combustion chamber 50 about a longitudinal axis 52. At least one fuel injector 54 is fluidly coupled to the combustion chamber 50 to supply fuel to the combustor 36. The fuel injector 54 can be disposed within the dome assembly 44 upstream of a flare cone 56 to define a fuel outlet 58. A swirler can be provided with the fuel nozzle assembly 38 to swirl incoming air in proximity to fuel exiting the fuel injector 54 and provide a homogeneous mixture of air and fuel entering the combustor 36.

Figure 3:
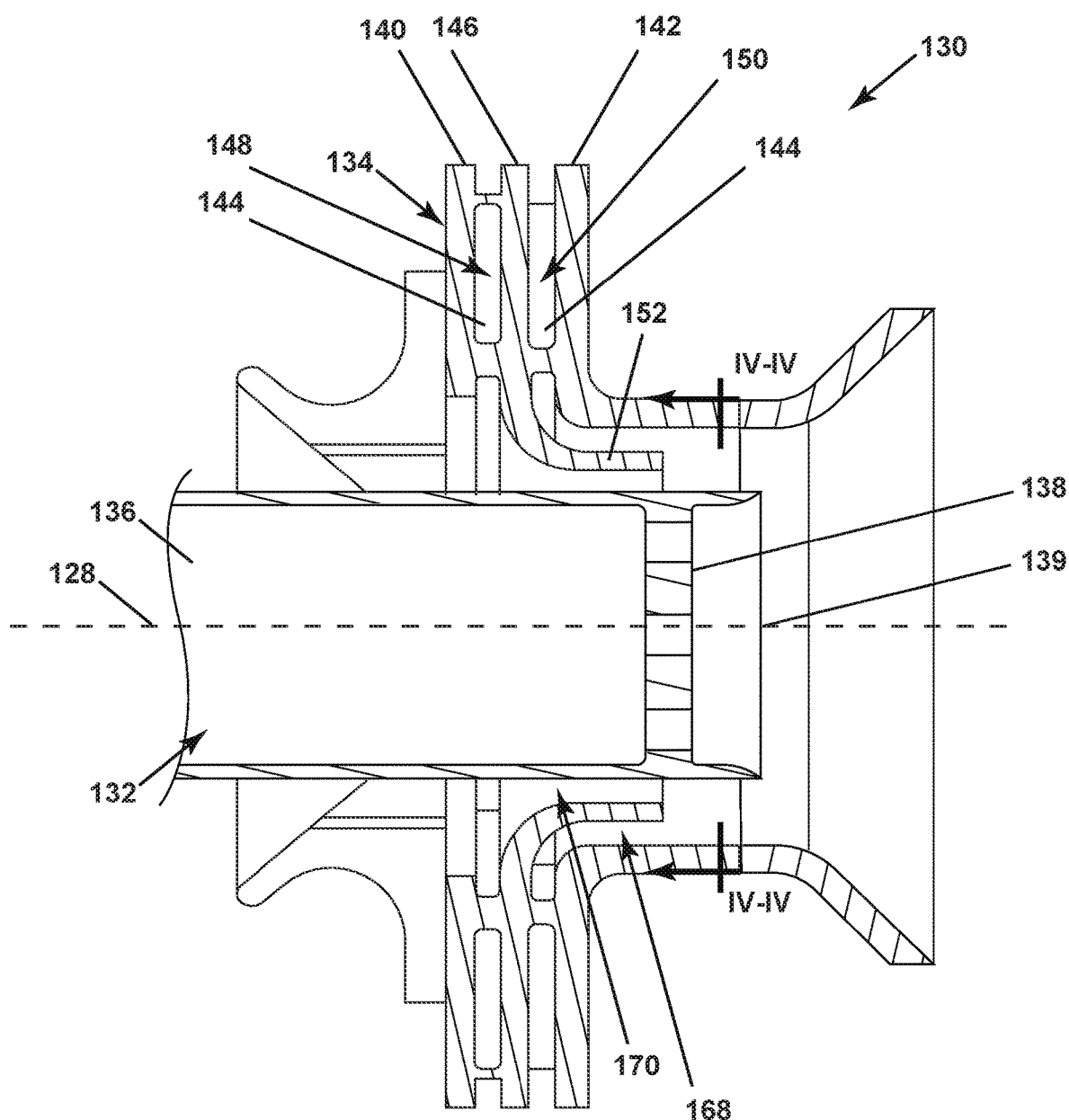
FIG. 3 is a cross-sectional view of a fuel nozzle assembly with a fuel nozzle including a nozzle cap, and a swirler having a splitter in accordance with an exemplary embodiment of the present disclosure.

FIG. 3 illustrates a fuel nozzle assembly 130, suitable for use in the combustor 36 as the fuel nozzle assembly 38 of FIG. 2, including a fuel nozzle 132, defining a longitudinal axis 128, and a swirler 134 circumscribing the fuel nozzle 132. The fuel nozzle 132 can provide a supply of fuel in a generally axial direction, while the swirler 134 can provide a swirling air flow in the axial direction with the air flow includes a tangential component to define the swirl. The air flow introduced to the swirler 134 can be from the radial or the axial direction, in non-limiting examples. The fuel nozzle 132 can define a fuel passage 136, with a nozzle cap 138 provided in the fuel passage 136 upstream of a nozzle tip 139. The swirler 134 includes a forward wall 140 and an aft wall 142, with a set of vanes 144 extending between the forward wall 140 and the aft wall 142. The vanes 144 can be provided at an angle, in order to impart a tangential component, or swirl component, to airflow passing through the swirler 134. A central wall 146 can separate the swirler 134 into a forward passage 148 and an aft passage 150, and the vanes 144 can be arranged as two sets of vanes within each of the forward passage 148 and the aft passage 150. A splitter 152 extends aft of the central wall 146 from the vanes 144. A swirler passage 162, downstream of the vanes 144, can be separated into a radially exterior passage 168 and a radially interior passage 170.

Figure 4:
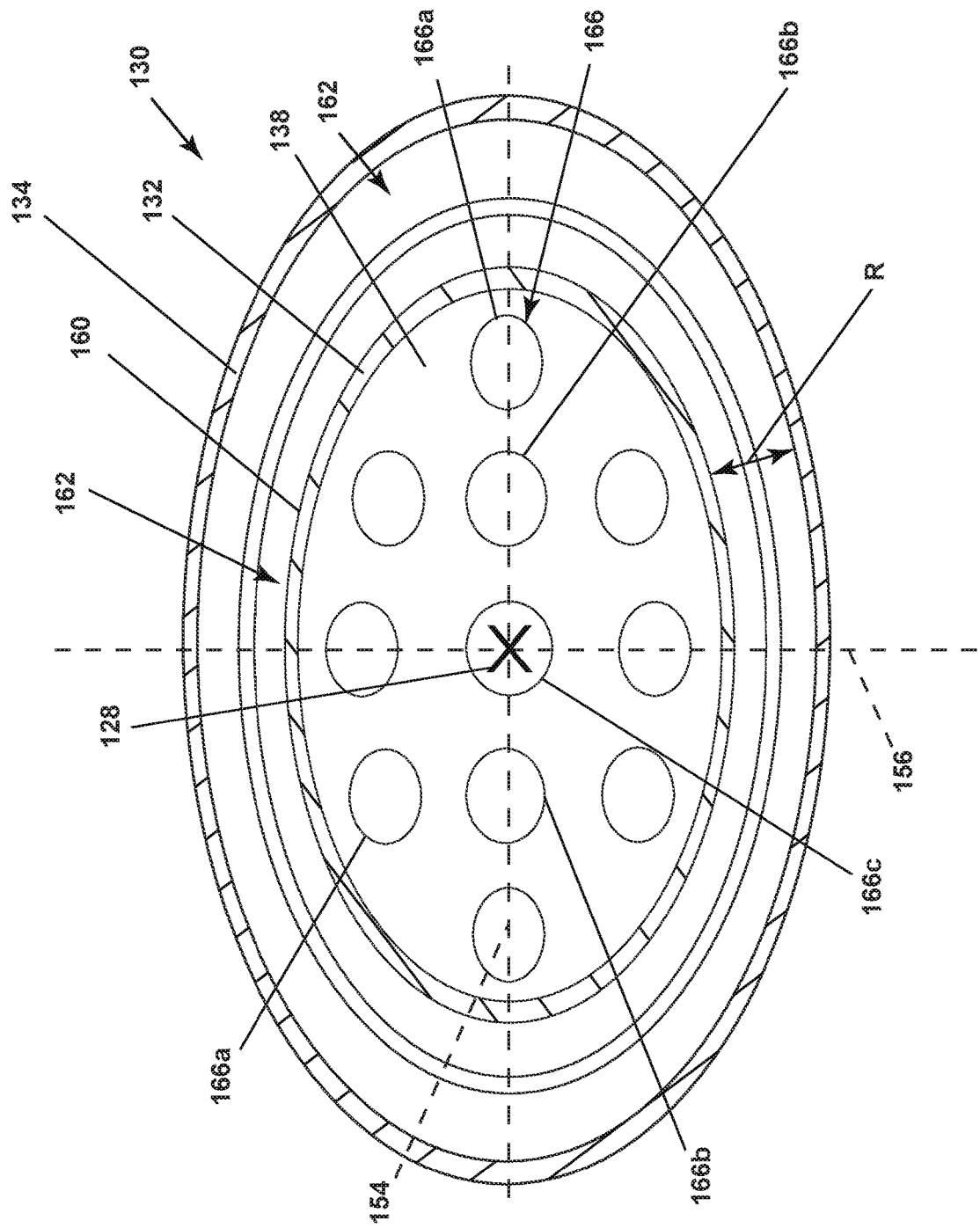
FIG. 4 is a cross-sectional view of the nozzle cap of FIG. 3, taken across section IV-IV of FIG. 3, looking forward at the nozzle cap in accordance with an exemplary embodiment of the present disclosure.

FIG. 4 shows a view of the fuel nozzle assembly 130, taken along section IV-IV of FIG. 3. The fuel nozzle 132 includes an exterior wall 160. The exterior wall 160 can include a circular or elliptical cross-sectional shape, as shown, including a lateral axis 154 extending in the lateral direction, and a transverse axis 156, perpendicular to the lateral axis 154. Additional shapes are contemplated, such as an oval, a stadium or discorectangle, or other curvilinear geometries in non-limiting examples. The lateral axis 154 can be aligned with a major axis defined by the elliptical shape of the fuel nozzle 132. More specifically, it is contemplated that the major axis can extend in the lateral direction, extending from the center of the ellipse, or alternatively can be extending from any point on the ellipse, such that the major axis is defined in the lateral direction, or parallel thereto, and the minor axis is defined perpendicular to the lateral direction, or along the transverse axis 156. Furthermore, the transverse axis 156 can be aligned with a ray extending from a longitudinal axis defined by the combustor section, a ray extending from a longitudinal axis defined by the fuel nozzle assembly 130, or a ray extending from the engine centerline. Additionally, it is contemplated that lateral axis 154 can be aligned tangent to a radius extending from a longitudinal axis defined by the engine centerline, the combustor section, or the fuel nozzle assembly 130.

A nozzle cap 138 is provided within the fuel nozzle 132. A set of openings 166 are provided in the nozzle cap 138. The nozzle openings 166 can be separated into radially exterior openings 166a and radially interior openings 166b, relative to a central opening 166c of the fuel nozzle cap 138. The radially exterior openings 166a can include a major axis that is parallel to the major axis defined by the nozzle cap 138. The radially exterior openings 166a and the radially interior openings 166b can include a circular or elliptical cross-sectional shape, while any cross-sectional shape is contemplated. It should be appreciated that the arrangement as shown is exemplary, and that different arrangements or shapes are contemplated, such as including more or less openings or other arrangements thereof.

The elliptical shape for the fuel nozzle 132 and the radially exterior openings 166a creates a higher concentration and downstream spread of fuel in the lateral direction, relative to the fuel nozzle 132, where the lateral direction can be defined in the circumferential direction relative to the engine centerline, or with respect to the annular combustor, or can be defined perpendicular to both the radial direction and the axial direction. In one example, the fuel nozzle 132, nozzle cap 138, or the openings 166 can define a total area, which can be a total cross-sectional area defined in the radial direction relative to the longitudinal axis 128 (illustrated as an "X", as the axis extends into and out of the page in FIG. 4) or the engine rotational axis 20 of FIG. 1. The elliptical or other non-circular shape can define provide a distribution of the total area where a greater amount of fuel is distributed along the lateral axis 154, and a comparatively lesser amount of fuel along the transverse axis 156. The nozzle openings 166 can collectively define a total area, and the arrangement of the nozzle cap 138 and the openings 166 arrange a greater amount of the total area along the lateral axis 154 and a relatively lesser amount along the transverse axis 156, or extending in a direction along the transverse axis 156, away from the lateral axis 154. This arrangement distributes a greater amount of fuel in the lateral direction along the lateral axis 154, which provides for a higher concentration of fuel in the circumferential direction about a combustor centerline, and a lesser concentration of fuel in the radial direction toward the combustor liners. Higher lateral concentrations and increased lateral spread of the fuel supply creates a relatively smaller concentration and decreased fuel spread in the radial or vertical direction, along the transverse axis 156, which can reduce flame scrubbing on the combustor liner downstream of the fuel nozzle assembly 130. Reduced flame scrubbing provides for improved durability for the liner, which permits the use of higher temperature fuels, such as hydrogen or hydrogen mixes in non-limiting examples, which can provide for reduce or eliminated carbon emissions or NOx emissions. Furthermore, reduced flame scrubbing can provide for reduced cooling requirements, which can improve cooling efficiency for the engine. The lateral orientation for the fuel nozzles 132 and the radially exterior openings 166a further improves cut-to-cup interaction, which can permit reduction of cup count, reducing engine complexity and weight.

Furthermore, a swirler passage 162 from the swirler 134, radially exterior of the exterior wall 160, can be circumferentially varied. This circumferential area variation can be done by utilizing differing shapes between the fuel nozzle 132 and the swirler 134, such as utilizing an elliptical fuel nozzle 132 with an elliptical swirler 134, defining a different ellipse than that of the fuel nozzle 132, to define a varying radial distance R between the two. The varying area in swirler passage 162 can change the velocity profile on the exterior wall 160 of fuel nozzle 132. The circumferential area variation can be such that larger gap is present in the lateral direction or along the lateral axis 154, and a relatively smaller gap is present in the vertical direction, or along the transverse axis 156. A larger gap creates a lower air momentum and allows fuel to penetrate more in the lateral direction, whereas a larger gap creates higher air momentum, resisting vertical fuel penetration. Higher air flow and less fuel penetration in the vertical direction helps to prevent high temperatures or flame scrubbing on the combustor liner wall. Higher fuel flow and high fuel penetration in lateral direction helps for better cup-to-cup flow interaction and allow cup count reduction. Increased lateral fuel provision can reduce cup count, which is a reduction in the number of fuel nozzle assemblies for the combustor, which reduces engine cost, complexity, and weight. Furthermore, the lateral fuel provision provides for increased cup spacing, without negative impact to flame propagation within the combustor.

Figure 5:
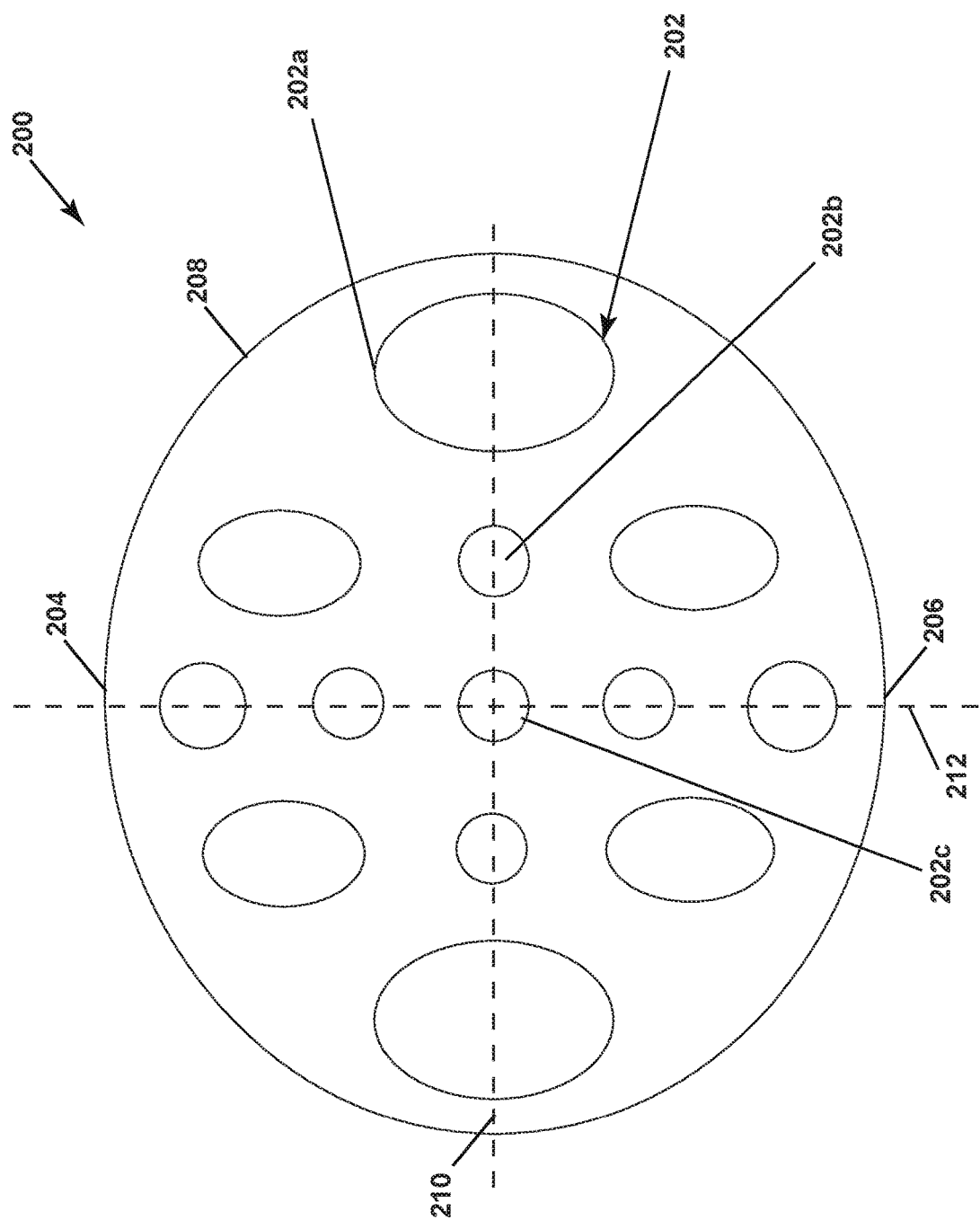
FIG. 5 is a view of an alternative nozzle cap for a fuel nozzle in accordance with an exemplary embodiment of the present disclosure.

FIG. 5 illustrates an alternative fuel nozzle cap 200, defining a lateral axis 210 and a transverse axis 212, and including a set of openings 202. The openings 202 can be arranged as an exterior set of openings 202a, an interior set of openings 202b, and a central opening 202c. The exterior openings 202a can include a circular or elliptical cross-sectional shape, for example, with a major axis arranged in the vertical or radial direction, parallel to the lateral axis 210. Furthermore, the exterior openings 202a can vary in cross-sectional area, such that the area increases extending in the lateral direction along the lateral axis 210, relative to the central opening 202c. Additionally, the exterior openings 202a can vary in cross-sectional shape, such that the exterior openings 202a have a circular cross-sectional at a radial top 204 and a radial bottom 206, along the transverse axis 212.

The interior set of openings 202b can include a circular cross-section and a common cross-sectional area, while alternative shapes, sizes, orientations, patterns, or arrangements are contemplated. Additionally, the cross-sectional area and shape of the central opening 202c can be the same as that of the interior set of openings 202b, while variation among the two is contemplated.

An outer wall 208 can define the shape of the fuel nozzle cap 200. The cross-sectional shape of the fuel nozzle cap 200 can be elliptical, with a major axis arranged in the along the lateral axis 210. Utilizing an elliptical shape for the nozzle cap 200 provides for limiting the radial extent of the fuel supplied through the fuel nozzle cap 200. Additionally, the elliptical shape for the nozzle cap 200 can provide for limiting the radial spread of fuel supplied by the radial orientation of the major axes of the exterior openings 202a. That is, the shape of the nozzle cap 200 limits the radial spread of fuel supplied by the exterior openings 202a, such that fuel is consistently spread by the exterior openings 202a, maintained within the radial limits defined by the shape of the nozzle cap 200.

Furthermore, the variation of the cross-sectional area of the exterior openings 202a provides for increased flow volumes in the lateral direction with decreased relative flow volumes in the radial direction. As the openings 202a in the lateral or circumferential direction have a larger cross-sectional area, which can provide increase fuel in the lateral direction, with lesser cross-sectional area openings providing fuel in the radial direction, which can maintain the flame radially within the combustor to reduce flame scrubbing on the combustor liners.

Figure 6:
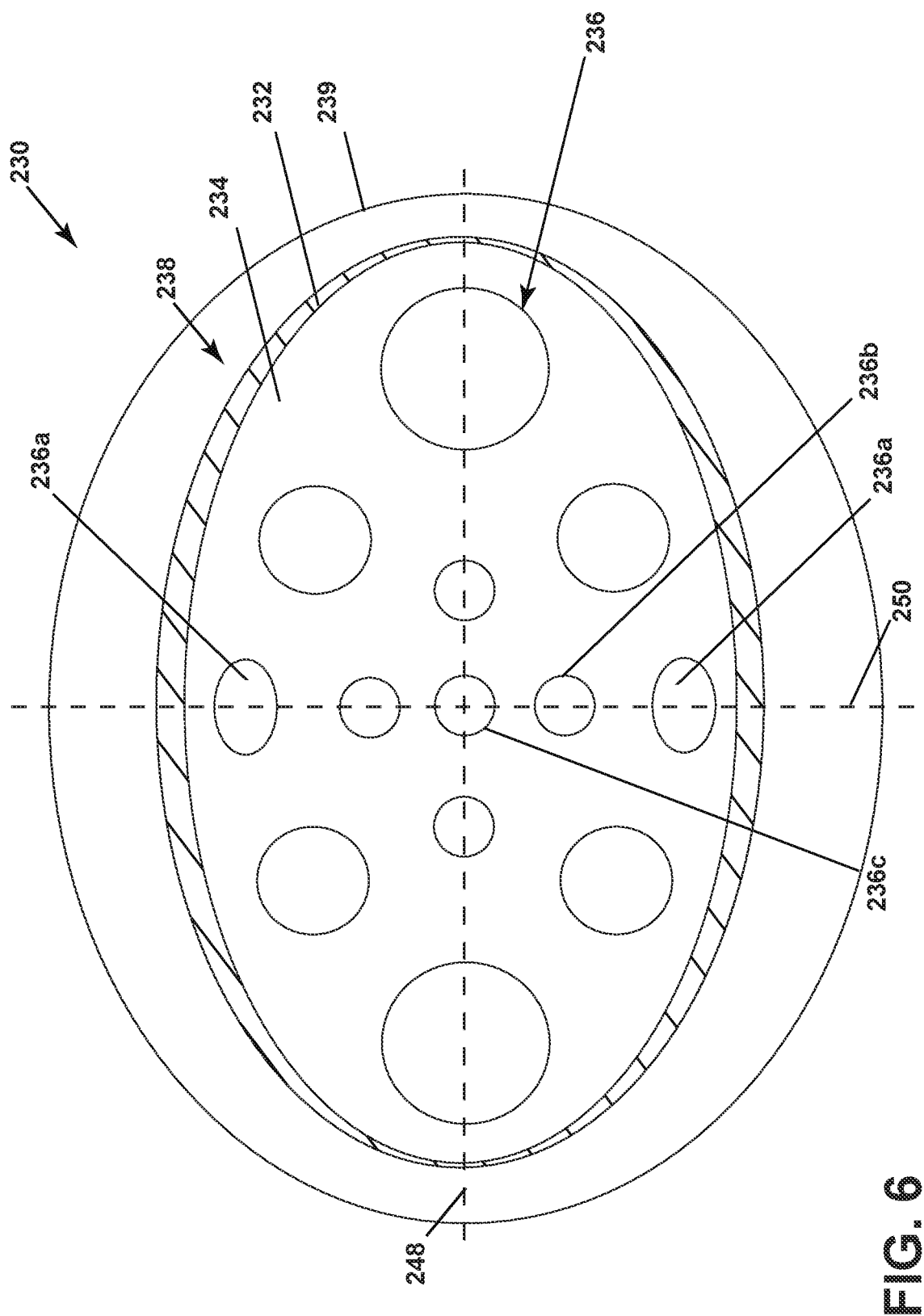
FIG. 6 is a view of an alternative fuel nozzle assembly, showing an exemplary nozzle cap for a fuel nozzle provided within a swirler in accordance with an exemplary embodiment of the present disclosure.

Referring to FIG. 6, another alternative fuel nozzle 230 including an outer wall 232 and a nozzle cap 234 defining a lateral axis 248 and a transverse axis 250. A set of openings 236 are provided in the nozzle cap 234, which can be arranged into an outer set of openings 236a, an inner set of openings 236b, and a central opening 236c. Similar to that of FIG. 5, the exterior openings 236a can have an increasing cross-sectional area extending in the lateral direction, and a decreasing cross-sectional area extending in the radial direction. The radially exterior-most and interior-most outer openings 236a can include an elliptical cross-sectional shape with the major axis defined in the lateral direction, such that the fuel emitted from the radially inner-most and outer-most openings 236a of the fuel nozzle 230 spreads in the lateral direction, which limits the radial spread of fuel within the combustor to reduce flame scrubbing on the combustor liner.

An annular swirler passage 238 can be defined between a swirler outer wall 239 and the fuel nozzle outer wall 232. The cross-sectional area of the swirler passage 238 can vary, similar to that of the exterior wall 160 for the fuel nozzle of FIG. 4, having an increasing cross-sectional area extending in the radially outward and inward direction, along the transverse axis 250, relative to the central opening 236c, while having a decreasing cross-sectional area in the circumferential direction, relative to the central opening 236c. The greater cross-sectional area at the radial extents provides for greater swirler flow volume, which improves radial containment of the flame, which further reduces flame scrubbing on the combustor liner and also improves lateral spread of the fuel from the fuel nozzle.

It is further contemplated that the outer wall 232 can include a varying cross-sectional area, or thickness defined in the radial direction, similar to that of the annular swirler passage 238. The cross-sectional area can increase in a direction along the transverse axis 250, while decreasing in a direction along the lateral axis 248, away from the transverse axis 250. In this way, the varying cross-sectional shape for the outer wall 232 can be used to vary the cross-sectional shape between the nozzle cap 234 and the swirler passage 238, such that a variation in shape between the swirler passage 238 and the nozzle cap 234, or fuel nozzle passage, can be achieved. Such variation permits greater control of lateral provision of both the fuel and the airflow provided from the swirler, which can be varied independent of one another via the outer wall 232.

Figure 7:
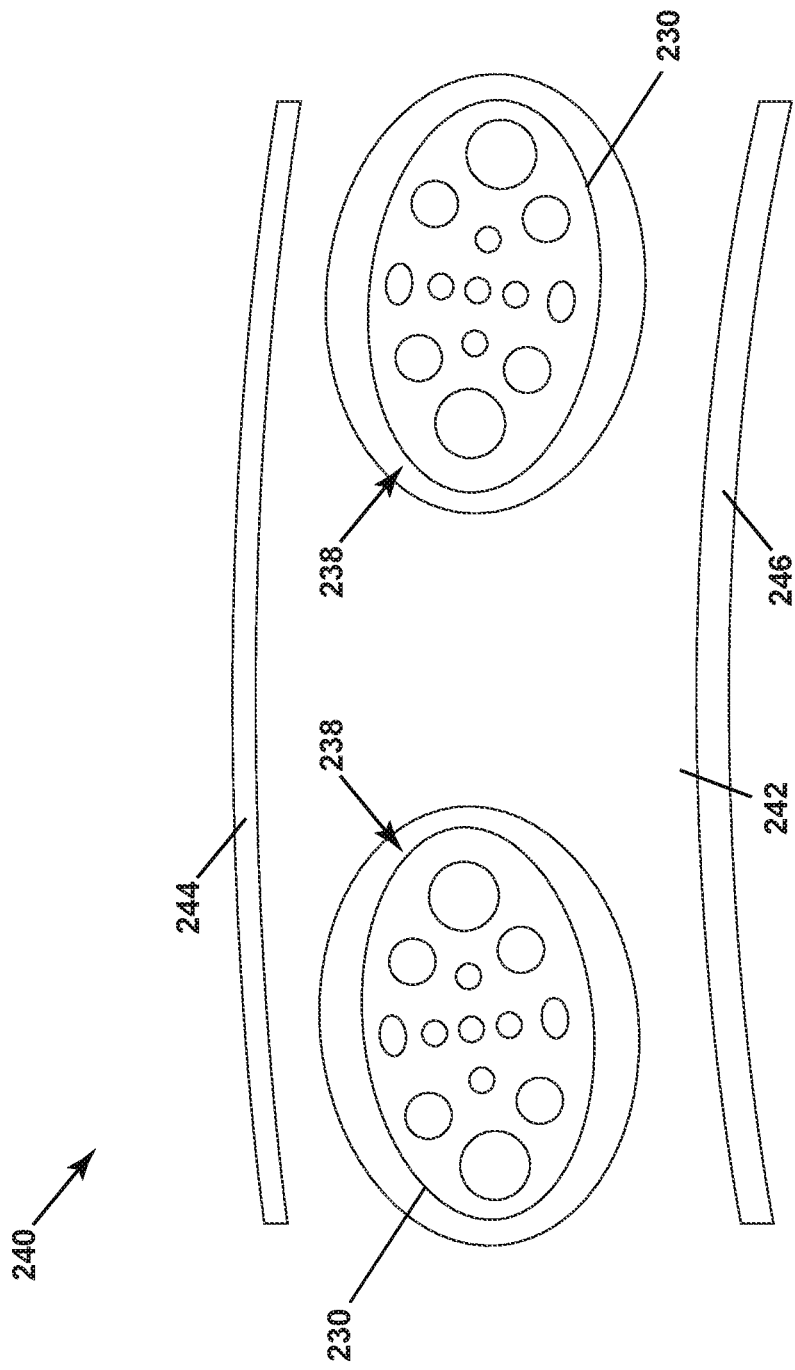
FIG. 7 is a view of an exemplary combustor illustrating two arranged fuel nozzle assemblies of FIG. 6 in accordance with an exemplary embodiment of the present disclosure.

FIG. 7 shows a portion of a circumferential combustor 240, looking in the forward direction at two of the set of fuel nozzles 230 of FIG. 6. The nozzles 230 are provided on a deflector 242 between an outer liner 244 and an inner liner 246. The shaping of the fuel nozzle 230 and the swirler passage 238 can provide improved radial flame control, which reduces flame scrubbing on the outer and inner liners 244, 246. Furthermore, the improved radial flame control provides for increased fuel nozzle spacing, which reduces the number of required fuel nozzles 230 for a combustor, which reduces overall system weight and complexity.

Figure 8:
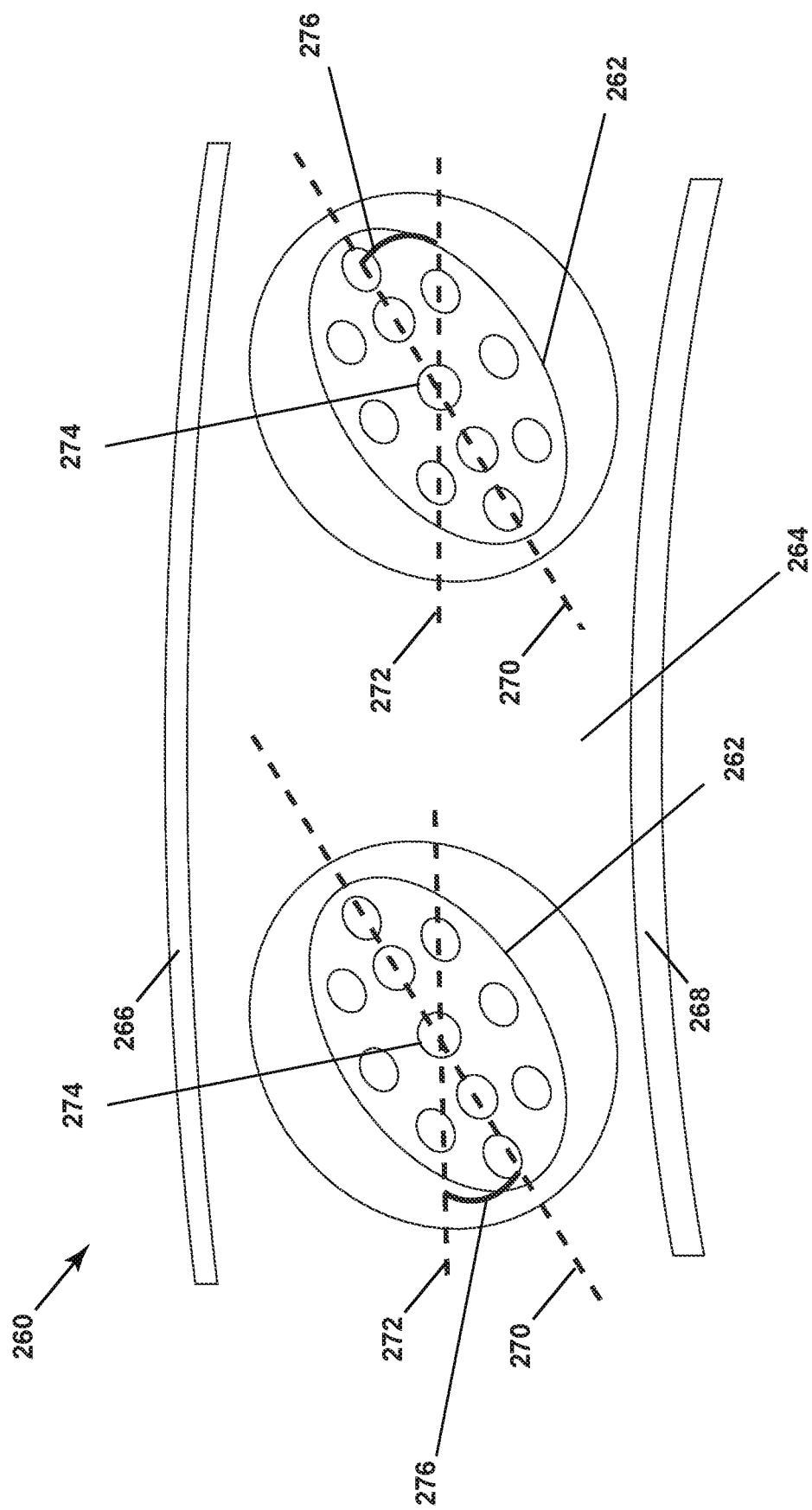
FIG. 8 is a view of another exemplary combustor illustrating an angular offset for fuel nozzles relative to the circumferential arrangement of the combustor in accordance with an exemplary embodiment of the present disclosure.

FIG. 8 shows a portion of another circumferential combustor 260, looking in the forward direction at two fuel nozzles 262 provided on a deflector wall 264 between an outer liner 266 and an inner liner 268. Each of the fuel nozzles 262 can be similar, including an elliptical cross-sectional shape defining a major axis 270. A tangential axis 272 can be defined for each fuel nozzle 262, where the tangential axis 272 is defined tangent to the circumferential direction, where the circumferential direction is defined by the engine rotational axis 20 of FIG. 1, or the annular combustor 260. The tangential axis 272 can extend in the tangential direction from the center of the fuel nozzles 262, at a central opening 274. An offset angle 276 can be defined as the angle between the tangential axis 272 and the major axis 270 for each fuel nozzle 262. The offset angle 276 can be between 0-degrees and 90-degrees, where 0-degrees represents an alignment between the major and tangential axes 270, 272 and 90-degrees represent an orthogonal offset such that the major axis 270 is aligned with the radial direction.

It is further contemplated that a subset of fuel nozzles 262 can be arranged at the offset angle 276, such as every other fuel nozzle 262 is arranged at the offset angle 276, and the other fuel nozzles 262 are not arranged at the offset angle 276. In another example, a first subset of fuel nozzles 262 can be arranged at a first offset angle 276, while a second subset of fuel nozzles can be arranged at a second offset angle, different than the first offset angle 276.

It should be appreciated that utilizing the angular offset can provide for increasing fuel spread as compared to having lesser or no angular offset. Furthermore, the offset can help account for the swirling flow within the combustor, such as reducing turbulence or shear relative to the tangential flow component.

Figure 9:
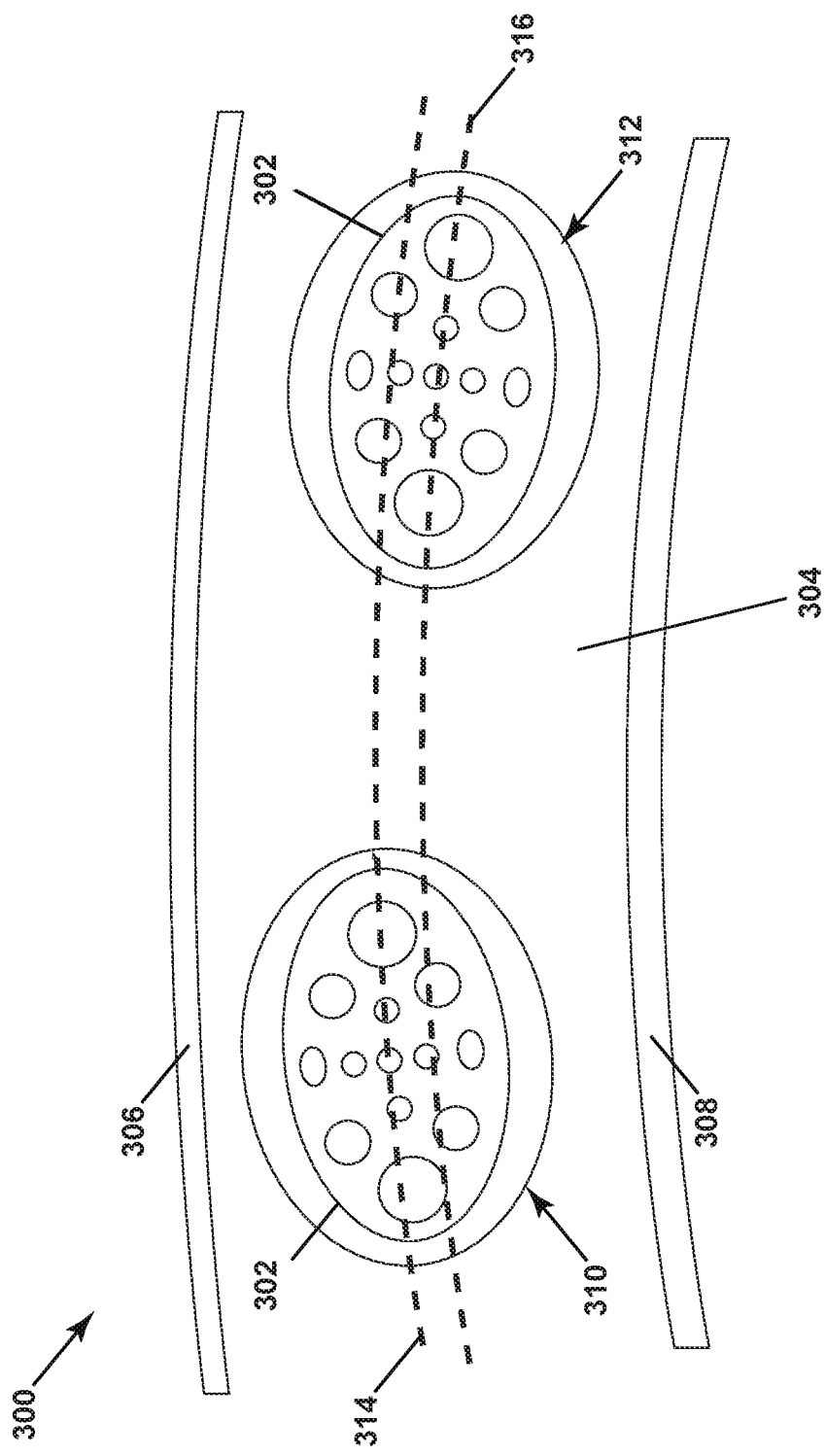
FIG. 9 is a view of another exemplary combustor illustrating a radial offset for fuel nozzles relative to the circumferential arrangement of the combustor in accordance with an exemplary embodiment of the present disclosure.

FIG. 9 shows a portion of another circumferential combustor 300, looking in the forward direction at two fuel nozzles 302 provided on a deflector wall 304 between an outer liner 306 and an inner liner 308. A first fuel nozzle 310 and a second fuel nozzle 312 can each include an elliptical shape defining a major axis. The major axis of the first fuel nozzle 310 can be arranged tangent to a first circumferential axis 314 and the major axis of the second fuel nozzle 312 can be arranged tangent to a second circumferential axis 316. The first and second circumferential axes 314, 316 can be offset in the radial direction. It should be appreciated that a set of fuel nozzles 302 can be provided in an annular arrangement about the combustor 300, and the set of fuel nozzles 302 can be separated into two subsets, with each subset aligned with either the first or second circumferential axes 314, 316. In this way, the fuel nozzles 302 can be staggered, which can be utilized to further increase spacing between fuel nozzles, or can be used to break combustion dynamics otherwise generated by a combustor without such staggering.

It should be further contemplated that the circumferential offset described in FIG. 9 can be combined with the angular offset of FIG. 8. For example, a set of fuel nozzles can includes a first subset aligned at a first circumferential axis, and arranged at a first offset angle, and a second subset is aligned with a second circumferential axis, spaced from the first circumferential axis, and arranged at a second offset angle, different than the first offset angle.

Figure 10:
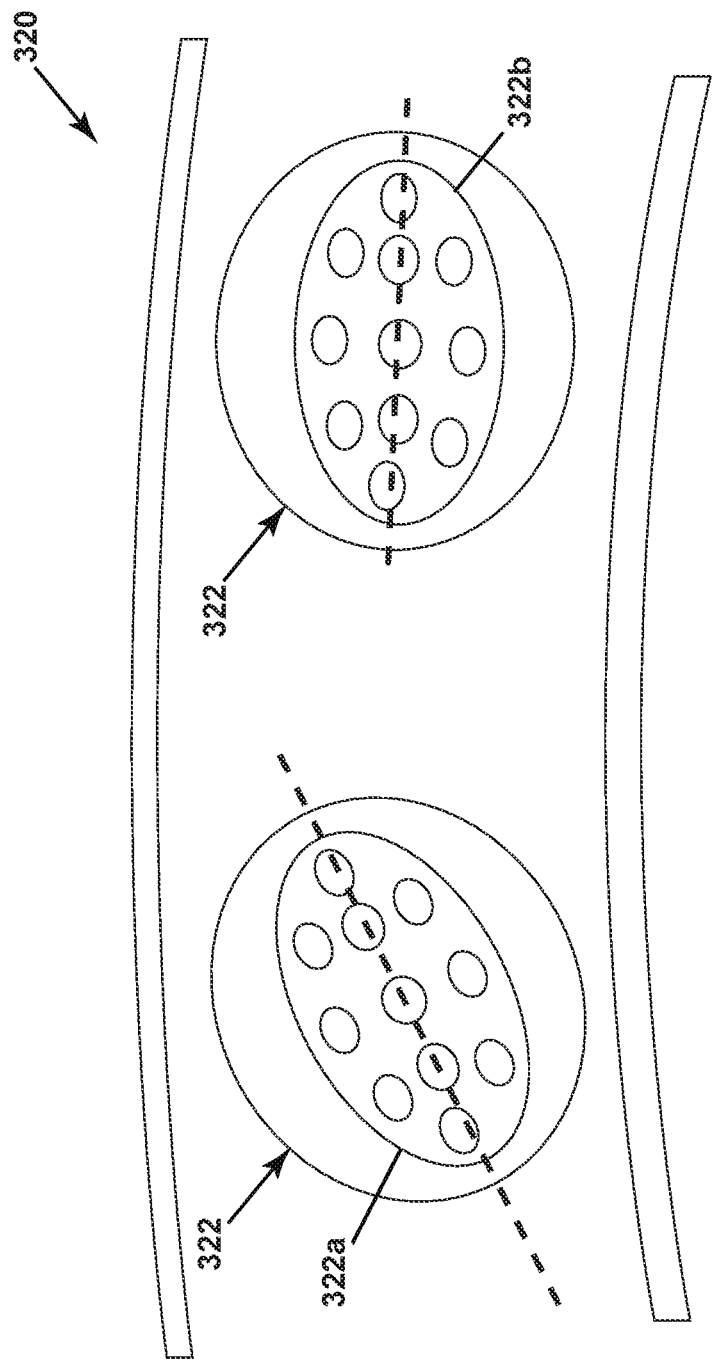
FIG. 10 is a view of another exemplary combustor illustrating an angular offset for one fuel nozzle, while another fuel nozzle includes no angular offset in accordance with an exemplary embodiment of the present disclosure.

Further still, referring to FIG. 10 showing another exemplary combustor 320, where each fuel nozzle 322 can be discretely arranged, such as at an angular offset, or a circumferential stagger, or combination thereof. Such arrangements can be defined about the annular combustor 320, such as every-other fuel nozzle 322a includes an angular offset, while every other fuel nozzle 322b does not, or that every other fuel nozzle 322b is arranged different than the first fuel nozzle 322a. Such patterns can be used to centrally-maintain the fuel distribution, while permitting increased flame control or shaping among a circumferential combustor, while providing for limited fuel spread in the radial direction, which can provide for reducing or eliminating flame scrubbing along the liners while permitting the use of higher temperature and burn speed fuels to reduce emissions and maintain efficiency.

Figure 11:
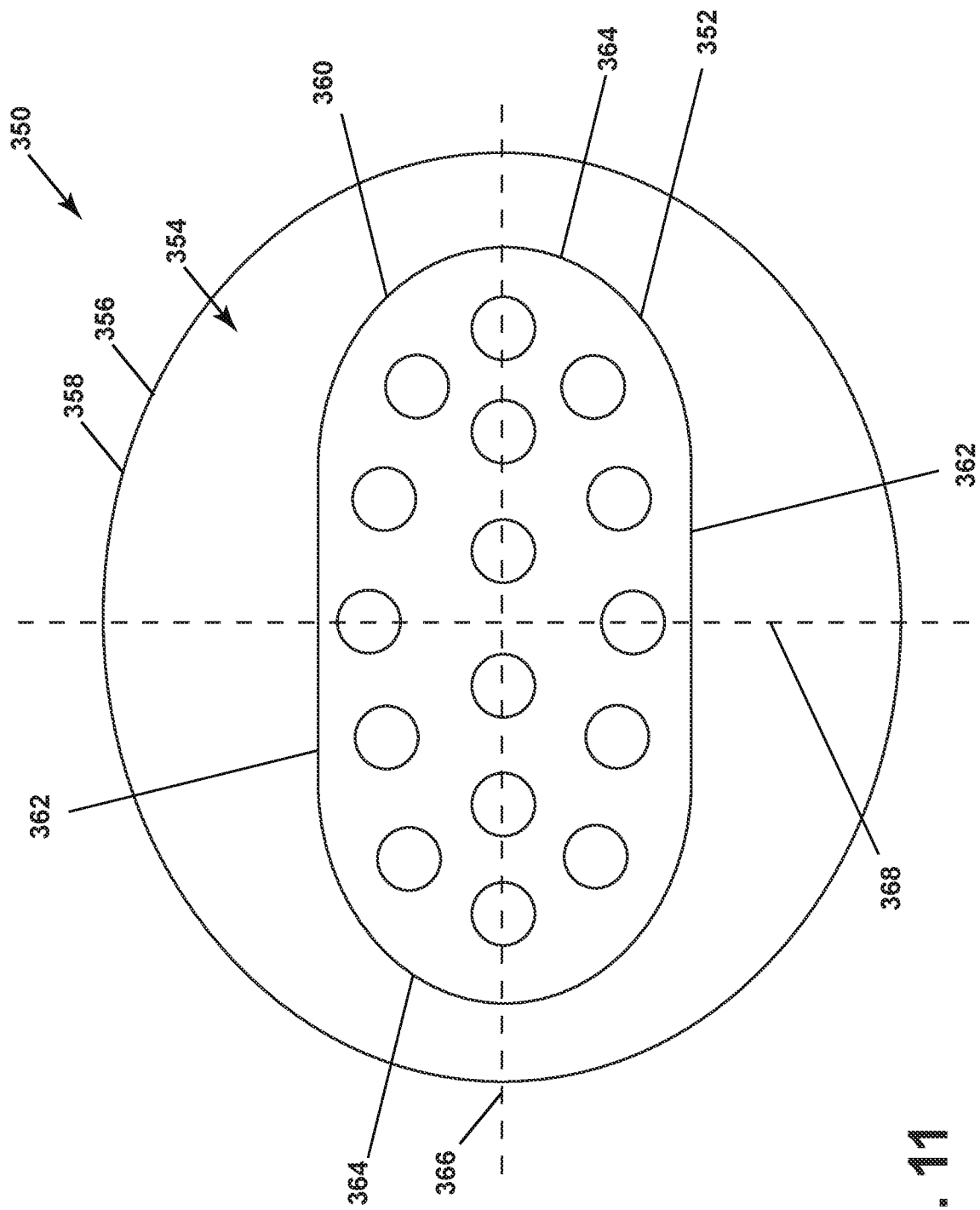
FIG. 11 is a view of another exemplary fuel nozzle assembly with a racetrack-shaped nozzle cap and elliptical swirler passage in accordance with an exemplary embodiment of the present disclosure.

FIG. 11 shows an exemplary, schematic cross-sectional view of a fuel nozzle assembly 350, defining a lateral axis 366 and a transverse axis 368, and including a fuel nozzle 352 circumscribed by a swirler passage 354 defined between a swirler wall 356 of a swirler 358 and an outer surface 360 of the fuel nozzle 352. The outer surface 360 can have a cross-sectional shape that is a racetrack shape, including linear sides 362 extending between curved ends 364, while additional shapes are contemplated. The swirler wall 356 can include an elliptical shape, with a major axis arranged parallel with the linear sides 362 of the fuel nozzle 352.

The differences in shape between the swirler 358 and the fuel nozzle 352 can be used to affect the local velocity, where a greater cross-sectional spacing between the swirler 358 and the fuel nozzle 352 can generate a lower fuel-and-air mixture, while lesser spacing between the swirler 358 and the fuel nozzle 352 can generate a greater mixture between the fuel and air, particularly in the lateral direction along the lateral axis 366, which can be utilized to limit the radial spread of the fuel, which provides for reducing flame scrubbing on the liner. In this way, it should be appreciated that the geometry of the swirler 358 can be utilized to define the local mixture between the fuel and the air, which can be utilized to control the flame shape or flame spread provided in the combustor, also decreasing flame scrubbing on the liners.

Figure 12:
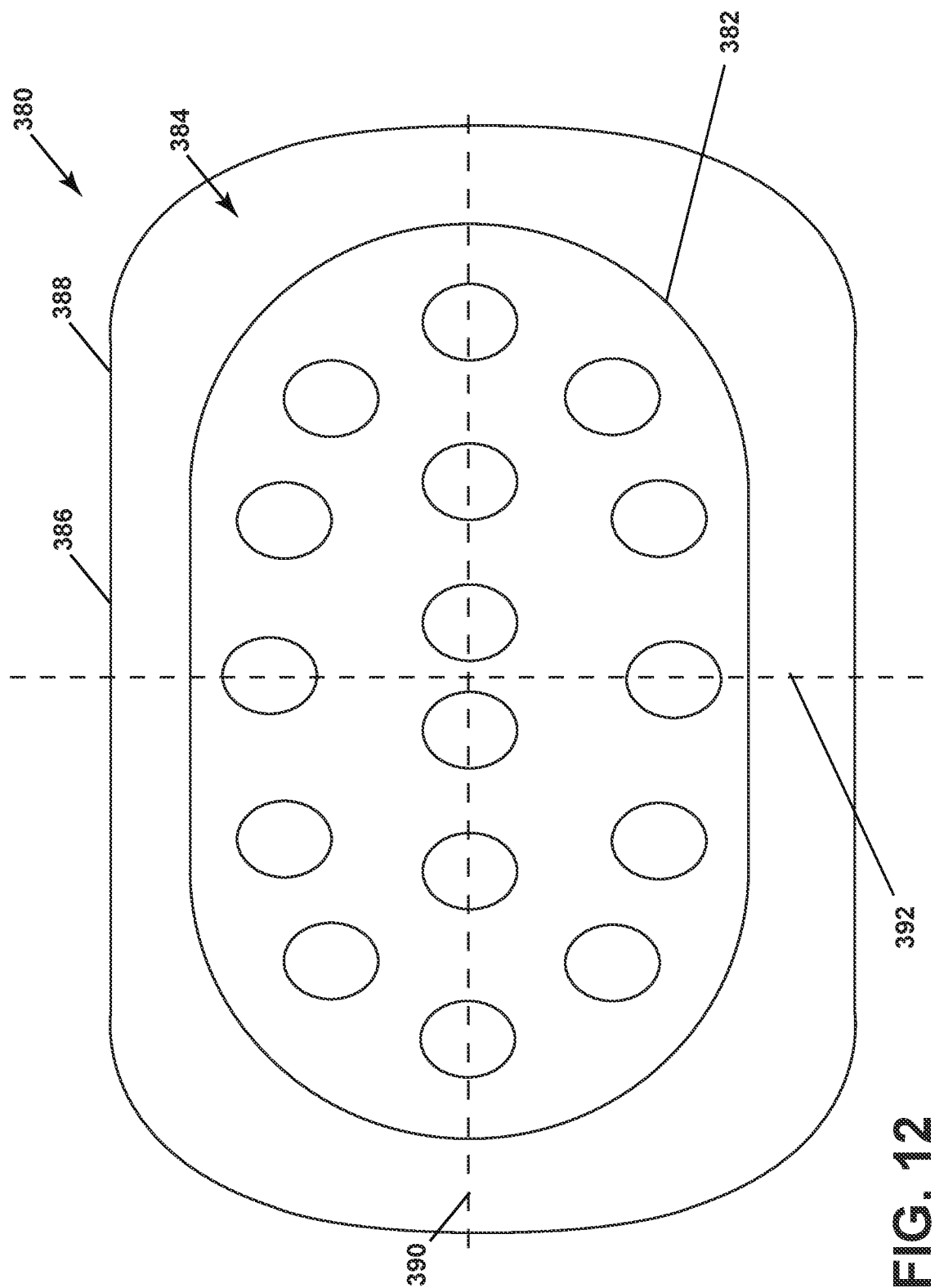
FIG. 12 is a view of yet another exemplary fuel nozzle assembly with a racetrack-shaped nozzle cap and racetrack-shaped swirler passage in accordance with an exemplary embodiment of the present disclosure.

FIG. 12 shows an alternative cross-sectional shape for a fuel nozzle assembly 380, defining a lateral axis 390 and a transverse axis 392, and includes a fuel nozzle 382 having a race track shape. A swirler passage 384 is defined between the fuel nozzle 382 and an outer wall 386 of a swirler 388. The outer wall 386 of the swirler 388 can be racetrack-shaped, being complementary to the shape of the fuel nozzle 382, such that a uniform cross-sectional distance is maintained for the entire swirler passage 384. In this way, it should be appreciated that the cross-sectional distance appears non-uniform as shown, while it should be understood that identical shapes are contemplated to define a constant distance around the entirety of the fuel nozzle 382.

Figure 13:
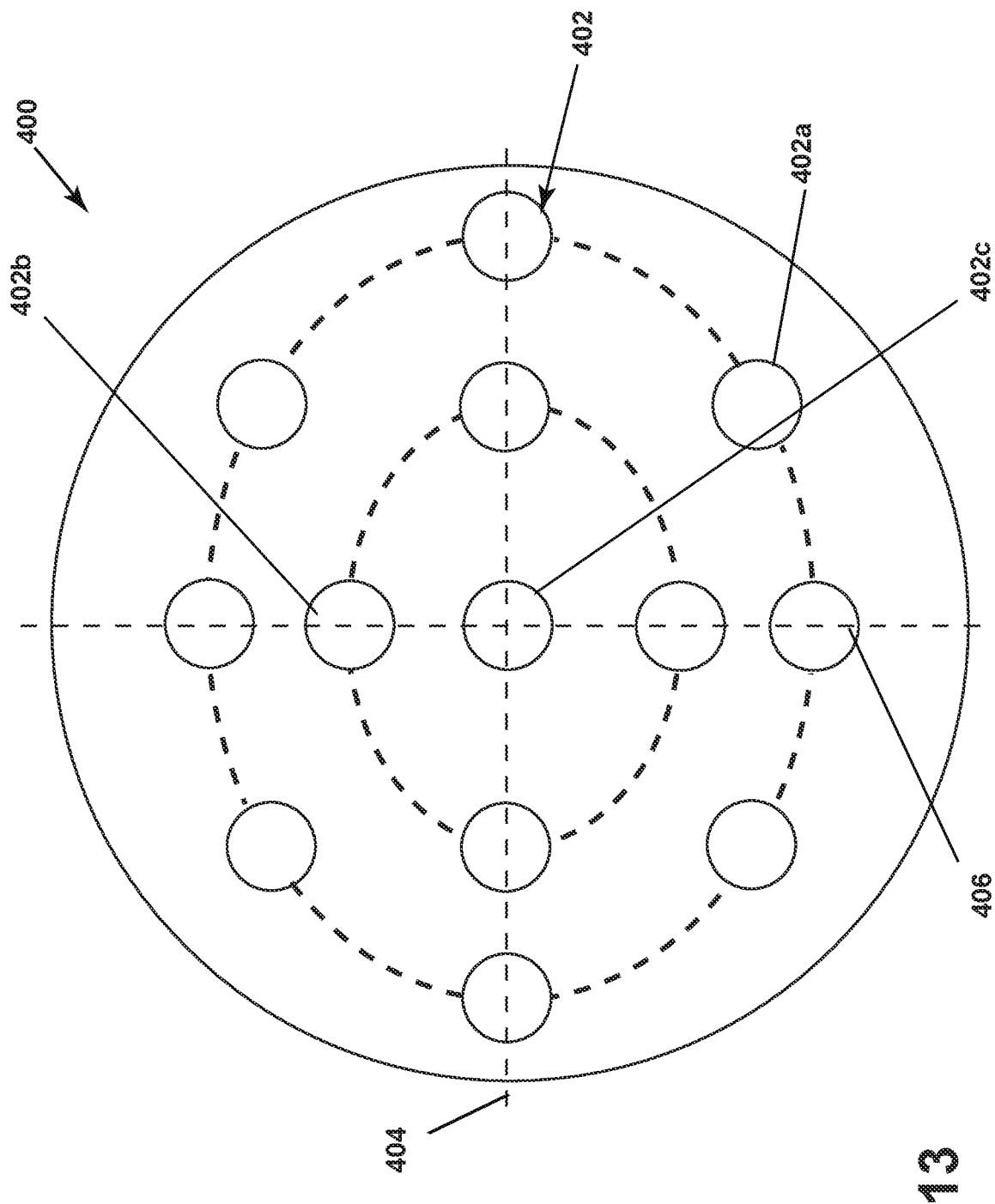
FIG. 13 is a view of a circular cap for a fuel nozzle including openings arranged in elliptical sets in accordance with an exemplary embodiment of the present disclosure.

FIG. 13 is a cross section of another exemplary fuel nozzle cap 400. The fuel nozzle cap 400 can be circular, defining a lateral axis 404 and a transverse axis 406, and includes a set of openings 402. The set of openings 402 can be arranged into annular rows or sets, visually identified by the curved broken lines, as an outer set of openings 402a, an inner set of openings 402b, and a central opening 402c. The outer and inner openings 402a, 402b can be arranged in an elliptical arrangement, such that a major axis is defined in the lateral direction along the lateral axis 404. The openings 402a-b provided in an elliptical arrangement can provide for increased lateral provision of fuel, which can reduce flame scrubbing along the liners, as well as reduce the required number of fuel nozzles.

Figure 14:
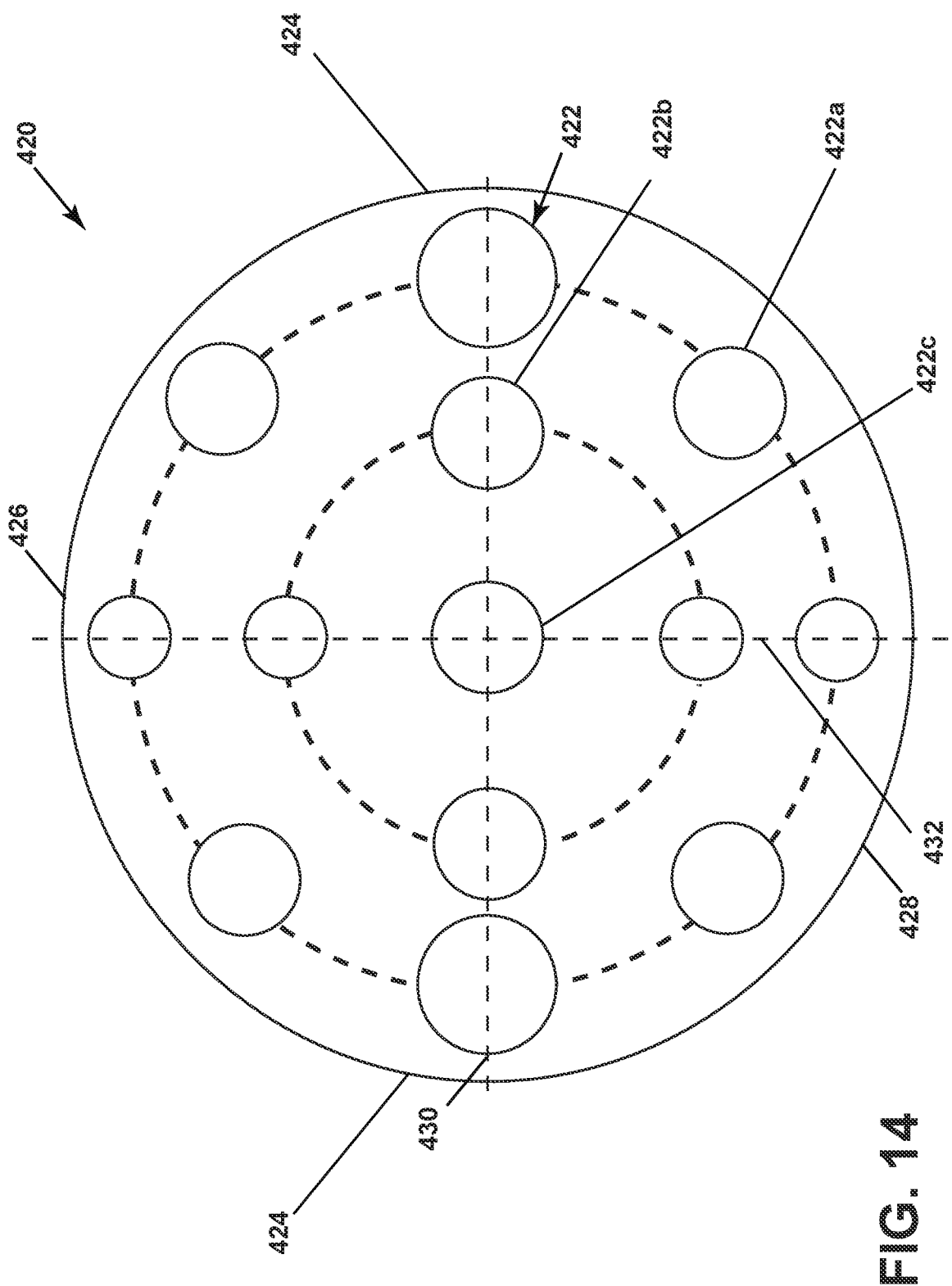
FIG. 14 is a view of another circular cap for a fuel nozzle including openings arranged in circular sets, with varying cross-sectional areas for the openings in accordance with an exemplary embodiment of the present disclosure.

FIG. 14 is another cross section of another exemplary fuel nozzle cap 420. The fuel nozzle cap 420 can be circular, defining a lateral axis 430 and a transverse axis 432, including a set of openings 422. The set of openings 422 can be arranged into annular rows, visually identified by the curved broken lines, as an outer set of openings 422a, an inner set of openings 422b, and a central opening 422c. The outer and inner sets of openings 422a, 422b can include an increased cross-sectional area for the openings 422a nearer to the lateral sides 424, or along the lateral axis 430, relative to the openings 422a, 422b nearer to a radial top 426 or a radial bottom 428, or arranged along the transverse axis 432. While the fuel nozzle cap 420 is circular, the increasing cross-sectional area for the openings moving in the lateral direction can provide for greater lateral provision of fuel, which can provide better radial flame control for the combustor, which can reduce flame scrubbing along the liner and reduce the number of required fuel nozzles.

Figure 15:
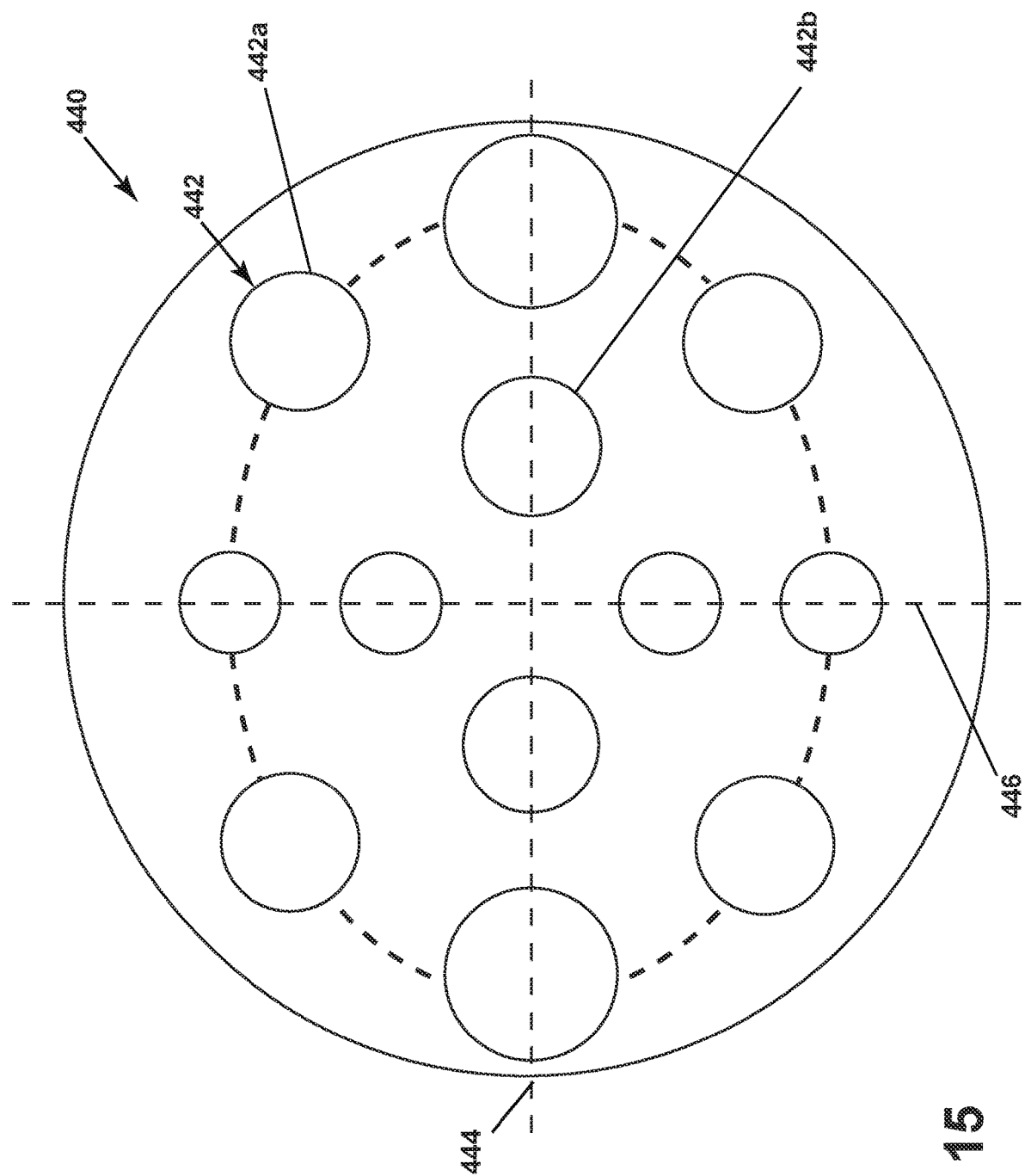
FIG. 15 is a view of yet another circular cap for a fuel nozzle including openings arranged in elliptical sets, with varying cross-sectional areas for the openings in accordance with an exemplary embodiment of the present disclosure.

FIG. 15 is another cross section of another exemplary fuel nozzle cap 440, defining a lateral axis 444 and a transverse axis 446, including openings 442 arranged into an outer circumferential row of openings 442a and an inner circumferential row of openings 442b. The nozzle cap 440 can be circular, while the rows of openings 442a, 442b can be arranged in an elliptical arrangement, similar to that of FIG. 13, and increasing cross-sectional area for the rows of openings 442a, 442b in the lateral direction, similar to that of FIG. 14.

Figure 16:
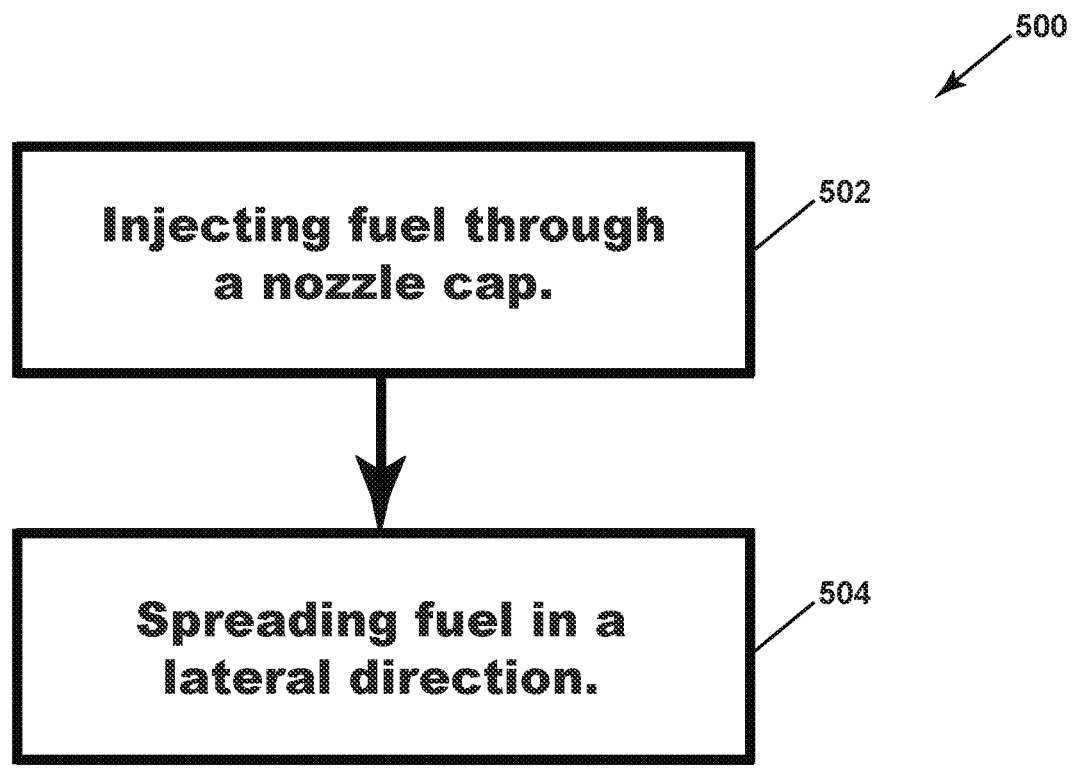
FIG. 16 is a flow chart showing a method injecting fuel from a fuel nozzle assembly in accordance with an exemplary embodiment of the present disclosure.

Referring now to FIG. 16, a method 500 for injecting fuel from a fuel nozzle assembly is provided. The fuel nozzle assembly for the method 500 can be any fuel nozzle assembly as described herein such as any of the fuel nozzle assemblies 130, 350, 380, and can include a fuel nozzle that defines a lateral axis and a transverse axis, such as fuel nozzles 132, 230, 262, 302, 322, 352, 382.

At 502, the method 500 can include injecting fuel through a nozzle cap, by injecting fuel through openings provided in the nozzle cap, such as that described herein, including the nozzle caps 138, 200, 234, 400, 420, 440 as described herein. The nozzle cap can define a total area, which can be defined as the cross-sectional area for the fuel nozzle.

At 504, the method 500 can further include spreading fuel in a lateral direction. Spreading fuel in the lateral direction can be accomplished by any means described herein. For example, a fuel nozzle or a nozzle cap, defining a lateral axis and a transverse axis, can be shaped such that a greater amount of the total area of the fuel nozzle or nozzle cap is provided along the lateral axis than the transverse axis, similar to that of FIGS. 4-6 and 11-12. In another example, the set of openings can further define a total area, as the collective cross-sectional area of all of the openings in the set of openings. A greater amount of the total area of the set of openings can be arranged closer to the lateral axis than the transverse axis, such as that of FIGS. 5-6 and 14-15. Such an arrangement of the nozzle cap, or the openings therein, provides for spreading a greater amount of fuel along the lateral axis and a lesser amount along the transverse axis.

In another example, the nozzle cap can define a non-circular shape, such that a major axis, or greatest diameter, is different from a minor axis, or least diameter. Arranging the major axis for the nozzle cap along the lateral axis provides for spreading a greater amount of fuel along the lateral axis. In yet another example, the set of openings can be arranged in an elliptical pattern, such that the arrangement defines a major axis along the lateral axis, providing a greater amount of fuel along the lateral axis as opposed to along the transverse axis, which can align with a minor axis defined by the elliptical arrangement of the set of openings, such as that of FIGS. 13 and 15.

The method 500 distributes a greater amount of fuel along the lateral axis defined by the nozzle cap or the openings therein, which provides for a higher concentration of fuel in the circumferential direction about a combustor centerline or engine rotational axis, and a lesser concentration of fuel in the radial direction, relative thereto. Higher lateral concentrations and increased lateral spread of the fuel supply creates a relatively smaller concentration and decreased fuel spread in the radial or vertical direction, which reduces flame scrubbing on the combustor liners. Reduced flame scrubbing provides for improved durability for the liner, which permits the use of higher temperature fuels, such as hydrogen or hydrogen mixtures, which reduce or eliminate carbon emissions or NOx emissions. Furthermore, reduced flame scrubbing can provide for reduced cooling requirements, which can improve cooling efficiency for the engine. The lateral orientation for the fuel nozzle assemblies, improves cut-to-cup interaction, which can permit reduction of cup count, reducing engine complexity and weight.

In this way, it should be appreciated that the examples used herein are not limited specifically as shown, and a person having skill in the art should appreciate that aspects from one or more of the examples can be intermixed and/or combined with one or more aspect from other examples to define examples that can differ from the examples as shown. For example, the openings arrangement of FIG. 15 can be applied in an angled orientation as shown in FIG. 10, while all combinations are contemplated disclosed herein are.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses: a turbine engine comprising: a compressor section, combustor section, and turbine section in serial flow arrangement, with the combustor section defining a longitudinal axis, and having a fuel nozzle assembly, the fuel nozzle assembly comprising: a fuel nozzle defining a longitudinal axis, a lateral axis, and a transverse axis perpendicular to the lateral axis, and including a nozzle cap; and a set of fuel openings provided in the nozzle cap collectively defining a total area, wherein the set of fuel openings are arranged in the nozzle cap such that a greater amount of the total area is distributed closer to the lateral axis than the transverse axis.

The turbine engine of any preceding clause, wherein at least one fuel opening of the set of fuel openings is elliptical with a major axis defined along the lateral axis.

The turbine engine of any preceding clause, wherein at least some fuel openings of the set of fuel openings are arranged as radially outer fuel openings relative to a radius extending from the longitudinal axis.

The turbine engine of any preceding clause, wherein at least some fuel openings of the set of fuel openings are arranged as radially inner fuel openings.

The turbine engine of any preceding clause, wherein the set of fuel openings further includes a central fuel opening and the central fuel opening is circular.

The turbine engine of any preceding clause, wherein at least some fuel openings of the radially outer fuel openings are different sizes than other fuel openings of the radially outer fuel openings, and wherein a size of the radially outer fuel openings increases in a direction extending along the lateral axis.

The turbine engine of any preceding clause, wherein at least one fuel opening of the set of fuel openings is elliptical with a major axis defined parallel to the transverse axis.

The turbine engine of any preceding clause, wherein the fuel nozzle is one of a set of fuel nozzles, where at least some fuel nozzles of the set of fuel nozzles are circumferentially offset from other fuel nozzles of the set of fuel nozzles defined in circumference relative to a radial direction perpendicular to the longitudinal axis.

The turbine engine of any preceding clause, wherein the fuel nozzle includes a set of fuel nozzles, where at least some fuel nozzles of the set of fuel nozzles are arranged at an angular offset, wherein the lateral axis is arranged at the angular offset relative to a tangential axis arranged tangent to a radial direction perpendicular to the longitudinal axis.

The turbine engine of any preceding clause, wherein the at least some fuel nozzles of the set of fuel nozzles arranged at the angular offset includes every other fuel nozzle of the set of fuel nozzles.

A fuel nozzle assembly comprising: a fuel nozzle, defining longitudinal axis, including a fuel passage terminating at a nozzle tip; and a cap provided in the fuel passage and including a set of openings, the cap defining a lateral axis and a transverse axis perpendicular to the lateral axis, wherein the cap defines a total area, and the cap is shaped such that a greater amount of the total area is distributed closer to the lateral axis than the transverse axis.

The fuel nozzle assembly of any preceding clause, further comprising a swirler circumscribing the fuel nozzle and defining a swirler passage between the swirler and the fuel nozzle, and wherein a swirler passage area is defined between the swirler and the fuel nozzle in a direction parallel to the lateral axis and the transverse axis, and a greater amount of the swirler passage area is distributed closer to the transverse axis.

The fuel nozzle assembly of any preceding clause, wherein the fuel nozzle further comprises an outer wall with a wall thickness, and wherein the wall thickness is greater along the lateral axis and relatively less along the transverse axis.

The fuel nozzle assembly of any preceding clause, wherein at least some openings of the set of openings are different sizes than other openings of the set of openings.

The fuel nozzle assembly of any preceding clause, wherein the set of openings increase in size in a direction extending along the lateral axis away from the transverse axis.

The fuel nozzle assembly of any preceding clause, wherein the set of openings further include radially inner openings and radially outer openings, and wherein the radially outer openings are arranged in an elliptical pattern.

The fuel nozzle assembly of any preceding clause, wherein the set of openings further includes at least one radially center opening arranged radially within both the radially outer openings and the radially inner openings.

A method of injecting fuel from a fuel nozzle assembly including a fuel nozzle and defining a lateral axis and a transverse axis, the method comprising: injecting a volume of fuel through a set of openings in a nozzle cap provided in the fuel nozzle; and spreading a greater amount of fuel in a direction along the lateral axis, and a relatively lesser amount of fuel in a direction along the transverse axis.

The method of any preceding clause, wherein the nozzle cap includes a non-circular shape configured to spread the greater amount of fuel in the direction along the lateral axis.

The method of any preceding clause, wherein the set of openings are arranged in an elliptical pattern defining a major axis along the lateral axis.

What is claimed is:
1. A turbine engine defining a rotational axis, the turbine engine comprising:
 a compressor section, combustor section, and turbine section in serial flow arrangement, with the combustor section defining an axis, and having a fuel nozzle assembly, the fuel nozzle assembly comprising:

a fuel nozzle terminating at a nozzle tip, surrounding a fuel passage, and defining a longitudinal axis;

a nozzle cap positioned within the fuel nozzle and spaced from the nozzle tip, the nozzle cap comprising:
- a lateral axis defined perpendicular to and intersecting the longitudinal axis, and the lateral axis tangent to a circumference about the rotational axis defined where the lateral axis intersects the longitudinal axis, and
- a transverse axis perpendicular to the lateral axis and the longitudinal axis; and a swirler circumscribing the fuel nozzle to supply a swirling air flow around the fuel nozzle;

a set of fuel openings provided in the nozzle cap collectively defining a total area, wherein the set of fuel openings are arranged in the nozzle cap such that a greater amount of the total area is distributed closer to the lateral axis than the transverse axis.

2. The turbine engine of claim 1, wherein at least one fuel opening of the set of fuel openings is elliptical with a major axis defined along the lateral axis.

3. The turbine engine of claim 1, wherein at least some fuel openings of the set of fuel openings are arranged radially exterior of at least some other fuel openings of the set of fuel openings relative to the longitudinal axis.

4. The turbine engine of claim 3, wherein the at least some fuel openings of the set of fuel openings arranged radially exterior are different sizes than the at least some other fuel openings of the set of fuel openings, and wherein a size of the at least some fuel openings of the set of fuel openings arranged radially exterior increases nearer to the lateral axis.

5. The turbine engine of claim 1, wherein at least some fuel openings of the set of fuel openings are arranged radially interior of at least some other fuel openings of the set of fuel openings relative to the longitudinal axis.

6. The turbine engine of claim 1, wherein the set of fuel openings further comprises a central fuel opening and the central fuel opening is circular.

7. The turbine engine of claim 1, wherein at least one fuel opening of the set of fuel openings is elliptical with a major axis defined parallel to the transverse axis.

8. The turbine engine of claim 1, wherein the fuel nozzle is one of a set of fuel nozzles, where at least some fuel nozzles of the set of fuel nozzles are circumferentially offset from other fuel nozzles of the set of fuel nozzles defined in circumference relative to a radial direction perpendicular to the longitudinal axis.

9. The turbine engine of claim 1, wherein the fuel nozzle is one of a set of fuel nozzles, where at least some fuel nozzles of the set of fuel nozzles are arranged at an angular offset, wherein the lateral axis is arranged at the angular offset relative to a tangential axis and arranged tangent to a radial direction perpendicular to the longitudinal axis.

10. The turbine engine of claim 9, wherein the at least some fuel nozzles of the set of fuel nozzles arranged at the angular offset includes every other fuel nozzle of the set of fuel nozzles.

11. The turbine engine of claim 1, wherein the nozzle cap is elliptical, wherein the lateral axis defines a major axis for the nozzle cap, and wherein the transverse axis defines a minor axis for the nozzle cap.

12. The turbine engine of claim 1, wherein the set of fuel openings include an exterior set of fuel openings and an interior set of fuel openings, wherein each fuel opening among the interior set of fuel openings is positioned radially interior of at least one fuel opening of the exterior set of fuel openings.

13. The turbine engine of claim 12, wherein each fuel opening among the set of interior fuel openings is positioned radially interior of at least one fuel opening of the exterior set of fuel openings relative to a direction extending perpendicular to the longitudinal axis.

14. A method of injecting fuel from a fuel nozzle assembly comprising a swirler circumscribing a fuel nozzle to supply a swirling air flow around the fuel nozzle, the fuel nozzle defining a longitudinal axis, surrounding a fuel passage, and terminating at a nozzle tip, the method comprising:

injecting a volume of fuel through a set of openings in a nozzle cap positioned within the fuel passage and spaced from the nozzle tip, wherein the nozzle cap defines a lateral axis arranged perpendicular to and intersecting the longitudinal axis, and the lateral axis tangent to a circumference about a rotational axis of a turbine engine defined where the lateral axis intersects the longitudinal axis, and a transverse axis defined perpendicular to the lateral axis and the longitudinal axis; and spreading a greater amount of fuel in a direction along the lateral axis, and a relatively lesser amount of fuel in a direction along the transverse axis.

15. The method of claim 14, wherein the nozzle cap includes a non-circular shape configured to spread the greater amount of fuel in the direction along the lateral axis.

16. The method of claim 14, wherein the set of openings are arranged in an elliptical pattern about the longitudinal axis.

17. The method of claim 14, wherein the nozzle cap is elliptical and at least some openings of the set of openings are arranged in a circular pattern about the longitudinal axis.

18. A fuel nozzle assembly for a turbine engine, the fuel nozzle assembly comprising:

a fuel nozzle with a fuel passage defining a longitudinal axis and terminating at a nozzle tip;

a nozzle cap positioned within the fuel passage and spaced from the nozzle tip, the nozzle cap having an elliptical cross-sectional shape defining a major axis defined circumferentially around the longitudinal axis and a minor axis extending radially relative to the longitudinal axis;

a swirler circumscribing a fuel nozzle to supply a swirling air flow around the fuel nozzle; and a set of fuel openings provided in the nozzle cap collectively define a total area, wherein the set of fuel openings are arranged in the nozzle cap such that a greater amount of the total area is distributed closer to the major axis than the minor axis.

19. The fuel nozzle assembly of claim 18, wherein the set of fuel openings further includes a central fuel opening and the central fuel opening is circular.

20. The turbine engine of claim 18, wherein the set of fuel openings include an exterior set of fuel openings and an interior set of fuel openings, wherein each fuel opening among the interior set of fuel openings is positioned radially interior of at least one fuel opening of the exterior set of fuel openings.

* * * * *